United States Patent
Chiyo

(10) Patent No.: US 9,537,791 B2
(45) Date of Patent: Jan. 3, 2017

(54) MANAGEMENT SYSTEM FOR DETERMINING WHETHER TO PROVIDE SERVICE TO DEVICE BASED ON PERMISSIBLE COMMUNICATION DATA AMOUNT

(71) Applicant: Naoki Chiyo, Kanagawa (JP)

(72) Inventor: Naoki Chiyo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 156 days.

(21) Appl. No.: 14/463,823

(22) Filed: Aug. 20, 2014

(65) Prior Publication Data

US 2015/0058433 A1 Feb. 26, 2015

(30) Foreign Application Priority Data

Aug. 20, 2013 (JP) .................. 2013-170214

(51) Int. Cl.
*H04L 12/911* (2013.01)
*H04L 12/24* (2006.01)

(52) U.S. Cl.
CPC ......... *H04L 47/822* (2013.01); *H04L 41/0896* (2013.01); *H04L 47/823* (2013.01); *H04L 47/824* (2013.01)

(58) Field of Classification Search
CPC ....... G06F 3/061; G06Q 30/02; H04L 12/145; H04L 47/822; H04L 47/823; H04L 47/824; H04L 41/0896; H04N 19/21; H04W 12/06; H04W 24/02; H04W 4/24; H04W 4/26

See application file for complete search history.

(56) References Cited

U.S. PATENT DOCUMENTS

2003/0198346 A1* 10/2003 Meifu .................... G06Q 30/02
380/258
2010/0022216 A1* 1/2010 Bandera .................. H04W 4/24
455/405
2013/0024634 A1* 1/2013 Shitomi .................. G06F 3/061
711/162

(Continued)

FOREIGN PATENT DOCUMENTS

JP 2003-244373 8/2003
JP 2006-059154 3/2006

*Primary Examiner* — Le Luu
(74) *Attorney, Agent, or Firm* — Oblon, McClelland, Maier & Neustadt, L.L.P.

(57) ABSTRACT

A management apparatus manages a plurality of devices. The management apparatus includes a management part that manages, for each one of the devices, one of communication systems used for carrying out communication between the management apparatus and the one of the devices and a communication data amount between the management apparatus and the one of the devices; a setting part that sets a permissible communication amount for each one of the communication systems; and a determination part that determines whether to be able to provide a service to one of the devices based on a communication data amount required for providing the service to the one of the devices, the permissible communication amount of one of the communication systems used by the one of the devices and a total of the communication data amounts of respective ones of the devices each using the one of the communication systems.

6 Claims, 11 Drawing Sheets

(56) References Cited

U.S. PATENT DOCUMENTS

| | | | |
|---|---|---|---|
| 2013/0217361 A1* | 8/2013 | Mohammed | H04W 12/06 455/411 |
| 2014/0129385 A1* | 5/2014 | Anderson | G06Q 30/0619 705/26.41 |
| 2014/0267583 A1* | 9/2014 | Zhu | H04N 19/21 348/14.13 |
| 2014/0355484 A1* | 12/2014 | Foster | H04W 24/02 370/255 |
| 2015/0237490 A1* | 8/2015 | Chang | H04W 4/26 455/406 |

* cited by examiner

FIG.4

| COMMUNICATION SYSTEM ID | COMMUNICATION DATA AMOUNT | PERMISSIBLE COMMUNICATION AMOUNT | NUMBER OF DEVICES | PERMISSIBLE COMMUNICATION AMOUNT PER DEVICE | CLOSING DATE |
|---|---|---|---|---|---|
| A | 1.0MB | 20.0MB | 1 | 20.0MB | 25TH |
| B | 20.0MB | 50.0MB | 10 | 5.0MB | 20TH |

FIG.5

| DEVICE ID | COMMUNICATION SYSTEM ID | COMMUNICATION DATA AMOUNT |
|---|---|---|
| 001 | A | 1.0MB |
| 002 | B | 3.0MB |
| 004 | B | 0.5MB |
| ... | ... | ... |

MANAGEMENT SYSTEM FOR DETERMINING WHETHER TO PROVIDE SERVICE TO DEVICE BASED ON PERMISSIBLE COMMUNICATION DATA AMOUNT

BACKGROUND OF THE INVENTION

1. Field of the Invention

The present invention relates to a management apparatus and a management system for managing a plurality of devices with each of which communication can be carried out through a communication medium.

2. Description of the Related Art

There is a management system for carrying out mutual communication between each device and a management apparatus for implementing services such as acquiring state information, receiving failure notifications, automatic ordering of consumables and/or the like. In such a management system, a management apparatus may use a radio communication system such as a Personal Handy-phone System (PHS) or a 3rd generation system for carrying out communication with each device as a management target. In such a case, a company that operates the management apparatus and manages the devices may make a contract with a radio communication service provider to use the radio communication service.

A specific contract style in this case may be, generally speaking, a "packet sharing" type where the cost is determined depending on a communication amount such as several MB per device per month. According to this contract type, the management apparatus can carry out communication for "the contract number of devices×the contract communication amount per device" a month in total between the management apparatus and the devices that are the communication targets.

As a technology concerning such a management system, one disclosed by Japanese Laid-Open Patent Application No. 2006-59154 (Patent Reference No. 1) is known, for example. According to Patent Reference No. 1, a management server is connected with a plurality of devices via a communication channel(s), determines, according to support contract information associated with each device, whether the device is permitted to update firmware and transmits firmware to the device only when the device is permitted to update firmware.

SUMMARY OF THE INVENTION

According to one aspect of the present invention, a management apparatus manages a plurality of devices. The management apparatus includes a first management part configured to manage, for each one of the devices, one of communication systems used for carrying out communication between the management apparatus and the one of the devices and a communication data amount between the management apparatus and the one of the devices; a setting part configured to set a permissible communication amount for each one of the communication systems; and a determination part configured to determine whether to be able to provide a service to one of the devices based on a communication data amount required for providing the service to the one of the devices, the permissible communication amount of one of the communication systems used by the one of the devices and a total of the communication data amounts of respective ones of the devices each using the one of the communication systems.

Other objects, features and advantages of the present invention will become more apparent from the following detailed description when read in conjunction with the accompanying drawings.

BRIEF DESCRIPTION OF THE DRAWINGS

FIG. 4 illustrates one example of a communication system table;

FIG. 5 illustrates one example of a device management table;

DETAILED DESCRIPTION OF THE EMBODIMENT

Figure 1:
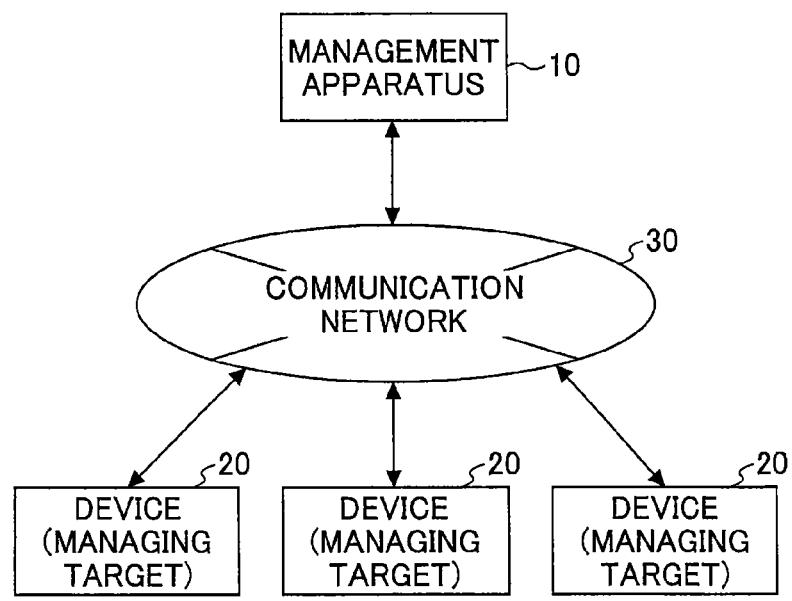
FIG. 1 illustrates a relationship between a management apparatus according to an embodiment of the present invention and devices managed by the management apparatus.

In the above-mentioned packet sharing type, it is preferable to control the communication amount per device to a smaller amount in order to reduce the cost. However, as a result of controlling the communication amount to a too small amount, it may become impossible to transmit data having a larger size such as firmware to a device.

If a person in charge should install firmware by himself or herself to each device while coming to the respective device, one by one, such a task may be very inefficient. Therefore, it may be desired to transmit firmware to each device which is a management target from the management apparatus.

Other than transmitting firmware, the same situation may occur also for a service requiring a communication amount larger than normal management operations.

The technology disclosed by Patent Reference 1 does not consider a communication amount, and therefore, does not solve such a problem.

The present embodiment has been devised in consideration of such a situation, and an object of the present embodiment is to provide a service requiring communication to a device to be managed, as efficiently as possible, even when a usable communication amount is limited.

Below, the embodiment of the present invention will be described in detail.

First, using FIG. 1, a relationship between a management apparatus according to the embodiment of the present invention and devices managed by the management apparatus will be described.

The management apparatus 10 is one embodiment of a management apparatus according to the present invention. The management apparatus 10 is capable of carrying out communication with a plurality of devices 20 to be managed (management targets) via a communication network 30. Concerning the management targets, it is possible to add another management target(s) thereto and/or remove any one(s) thereof at any timing.

The management apparatus 10 receives a notification from a device 20 and thus carries out management operations such as acquiring an operational state of the device 20 and/or carrying out diagnostics of the device 20, then, according to the result thereof, shipping a consumable(s) and/or arranging dispatch of a repair personnel, or so. It is also possible that the management apparatus 10 transmits a request to the device 20 to cause it to carry out a certain operation. For example, it can be possible to cause the device 20 to execute self-diagnostics and send back the result thereof, transmit firmware and cause the device to install it, or so.

The device 20 can be any type of an electronic device as long as it has a function of carrying out communication with the management apparatus via the communication network 30 and a function of carrying out transmission of a notification to and reception of a request from the management apparatus 10 to be managed by the management apparatus. For example, image forming apparatuses such as a printer, a copier, a facsimile machine and so forth and a projection apparatus such as a projector can be used as the devices 20.

In the example of FIG. 1, the three devices 20 are connected to the communication network 30. However, the number of devices 20 is not limited thereto.

The communication network 30 can be a wired or a wireless one and can be one of any standard. The communication network 30 can be an open network such as the Internet or a closed network using a private line. However, the advantageous effect of the present embodiment is developed more when being applied to a communication network limiting a data amount transmittable/receivable according to a service contract or so.

Note that a different communication system can be used depending on the particular device 20 with which the management apparatus 10 carries out communication.

Figure 2:
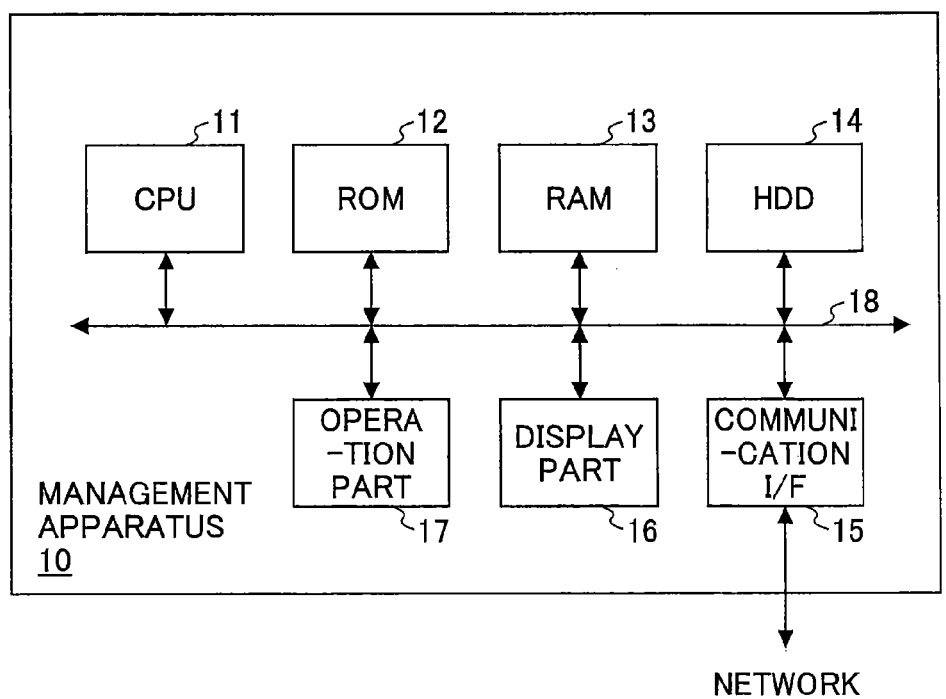
FIG. 2 illustrates a hardware configuration of the management apparatus illustrated in FIG. 1.

FIG. 2 illustrates a hardware configuration of the management apparatus 10.

The hardware of the management apparatus 10 can be hardware of a common computer. That is, the management apparatus 10 includes a CPU 11, a ROM 12, a ROM 13, a Hard Disk Drive (HDD) 14, a communication interface (I/F) 15, a display part 16 and an operation part 17 which are connected by a system bus 18.

In the management apparatus 10, as a result of the CPU 11 executing a program stored in the ROM 12 or the HDD 14 using the RAM 13 as a work area, the CPU controls the entirety of the management apparatus 10 and implements various functions of managing the devices 20, determining whether to be able to provide services to the devices 20 and so forth.

The HDD 14 is a non-volatile storage medium (storage part) and stores various programs executed by the CPU 11 and various data including tables described later.

The communication I/F 15 is an interface used for carrying out communication with external apparatuses/devices such as the devices 20. The communication standard of the communication I/F 15 can be any one which can be for wired communication or for wireless communication as long as it is suitable for communication via the communication network 30. It is also possible that the communication I/F 15 includes an interface(s) corresponding to a plurality of types of standards.

The display part 16 includes a display device or so and displays information to the operator.

The operation part 17 includes a keyboard, a mouse, a touch panel and/or the like and receives an operation from the operator.

Note that the display part 16 and/or the operation part 17 can be those externally connected or it is also possible that the management apparatus 10 can receive an operation through an external terminal apparatus connected via a network.

Similarly, each device 20 also includes a control part including a computer that includes a CPU, a ROM, a RAM, a storage part, a communication I/F and so forth. Other than them, the devices 20 can include different engine parts depending on their particular functions. When the device 20 is a printer, the device 20 includes a print engine. When the device 20 is a scanner, the device 20 includes a scanner engine. When the device 20 is a projector, the device 20 includes a projection optical system and/or the like. The hardware configurations of these engine parts and so forth can be known ones, and therefore, explanations thereof will be omitted.

Figure 3:
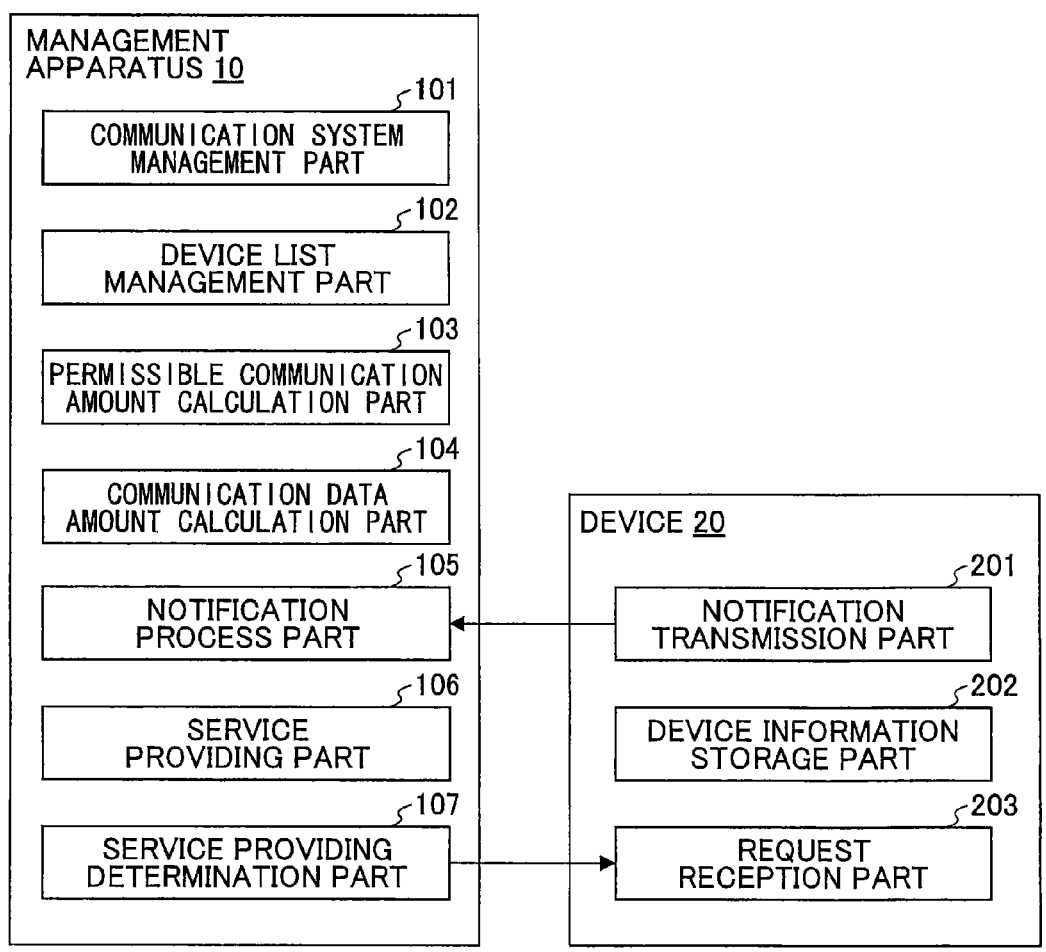
FIG. 3 illustrates a functional configuration of the management apparatus and a device illustrated in FIG. 1.

FIG. 3 illustrates a functional configuration of the management apparatus 10 and the device 10. Note that FIG. 3 mainly illustrates a configuration of parts concerning features of the embodiment. Further, the functions of the various parts illustrated in FIG. 3 are implemented as a result of the CPU 11 of the management apparatus 10 or the CPU of the device 20 executing a necessary program(s).

As illustrated in FIG. 3, the management apparatus 10 includes a communication system management part 101, a device list management part 102, a permissible communication amount calculation part 103, a communication data amount calculation part 104, a notification process part 105, a service providing part 106 and a service providing determination part 107.

Thereamong, the communication system management part 101 manages information concerning communication systems to be used for communication between the management apparatus 10 and the devices 20, respectively. This information is registered in a communication system table (FIG. 4) described later.

The device list management part 102 manages a list of the devices 20 to be managed by the management apparatus 10. This list is registered in a device management table (FIG. 5) described later. The device list management part 102 manages, for each of the devices 20 to be managed, the communication system used for communication between the management apparatus 20 and the device 20 and a communication data amount between the management apparatus 20 and the device 20.

The permissible communication amount calculation part 103 calculates a "permissible communication amount" for each of the communication systems registered in the communication system table. The "permissible communication amount" is calculated based on the contents of communication contract concerning the corresponding communication system which is input by the user. Specific examples thereof will be described later.

The communication data amount calculation part 104 calculates the amount of data transmitted/received when the management apparatus 10 and the device 20 carry out communication and manages the sum total thereof for each device. The sum total value is registered in the device management table (FIG. 5). Further, the communication data amount calculation part 104 also calculates, for each communication system, the total of the communication amounts of the devices 20 using the communication system. The thus acquired total amount is registered in the communication system table (FIG. 4).

The notification process part 105 receives a notification from a device 20, and carries out a process for managing the device 20 required according to the notification. For example, the notification process part 105 produces an operation history for each device 20 according to received notifications, arranges a delivery of consumables in response to a received notification indicating that the remaining amount of consumables is small, or so. It is also possible that the notification process part 105 can transmit a request from the management apparatus 10 to a device 20.

The service providing part 106 provides a service to a device 20, the service being a service accompanied by communication and not very likely to be required during a normal management process. This service is, for example, updating firmware, more detailed diagnostics than normally required for when there is a likelihood of having a failure, or so. Routinely occurring services such as a regular notification, ordering of consumables and so forth are provided by the notification process part 105. The administrator of the management apparatus 10 can appropriately determine which services are to be provided by the notification process part 105 and which services are to be provided by the service providing part 106. Services which are not needed normally and require transfers of large amounts of data so that the service providing determination part 107 determines whether to be able to provide the service can be determined as those to be provided by the service providing part 106.

The service providing determination part 107 determines whether to be able to provide a service which is to be provided to a device 20 by the service providing part 106. The detailed determination method will be described later.

Each device 20 includes a notification transmission part 201, a device information storage part 202 and a request reception part 203.

Thereamong, the notification transmission part 201 transmits a "notification" required to be managed by the management apparatus 10 to the notification process part 105 of the management apparatus 10. "Notifications" can include, for example, a notification of an operation history of the device 20, a consumables near-end notification, an error occurrence notification and so forth. A request for the management apparatus 10 can also be included. Each notification includes identification information of the device 20 which is the transmission source.

The notification transmission part 201 transmits a registration request to the management apparatus 10 for causing the management apparatus 10 to register this device 20 as a management target of the management apparatus 10. This point will be described later.

The device information storage part 202 stores information required for operations of the device 20 and/or information needed to be managed by the management apparatus 10 such as an operation history, settings, identification information and/or the like of the device 20. The device information storage part 202 stores also firmware of the device 20.

The request reception part 203 receives a request transmitted by the management apparatus 10 and carries out an operation according to the request. The operation can be, for example, updating firmware, executing self-diagnostics or so. However, it is not necessary to limit thereto.

Next, data stored by the management apparatus 10 and used for determining by the service providing determination part 107 whether to be able to provide a service will be described.

FIG. 4 illustrates one example of the communication system table.

The communication system table registers information concerning the communication systems used for communication between the management apparatus 10 and the devices 20 and includes items of "communication system ID", "communication data amount", "permissible communication amount", "number of devices", "permissible communication amount per device" and "closing date".

Thereamong, the item "communication system ID" corresponds to identification information for identifying each communication system. The item "communication data amount" corresponds to, concerning all the devices 20 which use a communication system, the total of the respective communication data amounts transmitted during communication between the management apparatus 10 and these devices 20. That is, the item "communication data amount" corresponds to the total data amount transmitted/received by the management apparatus 10 using the communication system identified by the communication system ID. This amount is reset to zero every totaling period (here, one month, for example, and should not be limited thereto).

The item "permissible communication amount" corresponds to an upper limit of a data amount that can be transmitted/received during one totaling period by the management apparatus 10 using the communication system identified by the communication system ID. What occurs (for example, an excess charge is required, a communication amount is limited to a certain amount, or so) when the permissible communication amount is exceeded depends on the particular contract conditions determined with the communication service company. Here, it is assumed that the communication contract is of a packet sharing type and the permissible communication amount is acquired from multiplying the used number of devices 20 and "permissible communication amount per device". Further, the total communication data amount, not per device but for all the devices, i.e., the value of the above-mentioned item "communication data amount" is used for managing as to whether the permissible communication amount is exceeded. For a case of different contract conditions, the permissible communication amount can be calculated and will be appropriately used for the management according to the contract conditions.

The item "number of devices" corresponds to the number of devices 20 each of which is registered as carrying out communication with the management apparatus 10 using the communication system identified by the communication system ID.

The item "permissible communication amount per device" corresponds to an upper limit of a data amount that can be transmitted/received by the management apparatus 10 with one registered device 20 during one totaling period.

The item "closing date" corresponds to the last day of a totaling period.

Thereamong, the "permissible communication amount per device", the "closing date" and the method of calculating the "permissible communication amount" are determined according to the contract conditions determined with the communication service provider and the management apparatus 10 sets them according to the contents of the contract conditions that are input by the operator. The "permissible communication amount per device" is used to calculate the "permissible communication amount". Therefore, for a case where the "permissible communication amount" is calculated by a different method, the "permissible communication amount per device" may be unnecessary.

Note that, according to the embodiment, communication between the management apparatus 10 and a device 20 is regarded as belonging to a different communication system not only a case where the technical standard thereof is different but also a case where the communication service provider is different, a case where the contents of the communication service contract are different or a case where the group calculating the total of the communication amounts for a case of the packet sharing type is different, and thus, is registered in the communication system table separately. This is because, in these cases, the communication data amount and the permissible communication amount are to be managed individually.

For setting the "closing date" in the communication system table described above, the CPU 11 in the management apparatus 10 acts as a second management part. Further, for setting the "permissible communication amount", the CPU 11 acts as a setting part.

FIG. 5 illustrates one example of the device management table.

The device management table is a table to register the devices 20 as management targets of the management apparatus 10 and includes items of "device ID", "communication system ID" and "communication data amount".

Thereamong, the item "device ID" corresponds to identification information for identifying a device 20.

The item "communication system ID" corresponds to identification information for identifying a communication system that the device 20 identified by the "device ID" uses for carrying out communication with the management apparatus 10. Any one of the "communication system IDs" registered in the communication system table of FIG. 4 is registered in this item.

The item "communication data amount" corresponds to a data amount that has been transmitted/received between the management apparatus 10 and the device 20 identified by the device ID during the current totaling period. This amount is reset to zero every totaling period.

For registering the communication data amount in the device management table, the CPU 11 in the management apparatus 10 acts as a first management part.

Next, operations and processes carried out by the management apparatus 10 and the devices 20 will be described. The operations and the processes which will be described now are implemented as a result of the CPU 11 in the management apparatus 10 and the CPUs in the devices 20 executing necessary programs. However, for the sake of simplifying the explanation, description will be made as if the management apparatus 10 and the device 20 themselves carry out the operations and the processes.

Figure 6:
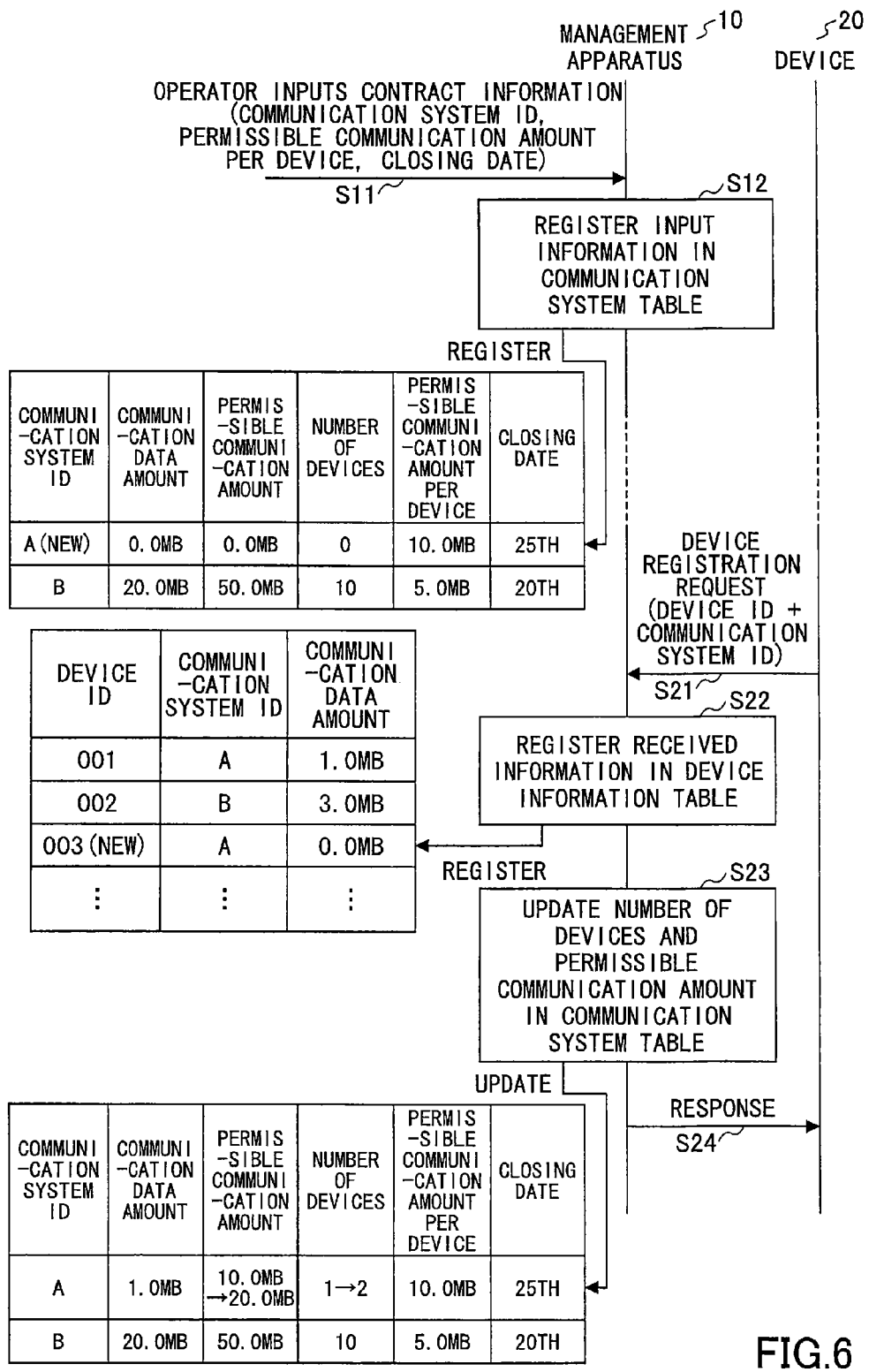
FIG. 6 illustrates one example of operations of the management apparatus and a device when a communication system is registered in the management apparatus and the device to be registered is registered in the management apparatus.

FIG. 6 illustrates one example of operations of the management apparatus 10 and a device 20 when a communication system is registered in the management apparatus 10 and the device 20 to be registered is registered in the management apparatus 10.

When registering a communication system, the operator of the management apparatus 10 inputs information of the contract conditions to the management apparatus 10 and inputs an instruction to register the information (S11). What is input here are the "communication system ID" to be set (unnecessary at a time of automatic setting) and information of the "permissible communication amount per device" and the "closing date" determined according to the contract.

The management apparatus 10 thus receives the registration instruction and then adds a new entry for the communication system in the communication system table based on the input information (S12). In Step S12, in the items of "communication system ID", "permissible communication amount per device" and "closing date", the information that is input in Step S11 is registered. As for the other items, initial values are registered. As a result of the completion of this registration process, the management apparatus 10 can receive a registration request sent from a device 20 for carrying out communication using this new communication system.

FIG. 6 illustrates an example of the communication system table where in Step S12, the communication system having the communication system ID "A" is newly registered.

For registering a device 20 as a management target of the management apparatus 10, the device 20 transmits a "device registration request" to the management apparatus 10 (S21). The "device registration request" includes the device ID of the device 20 and the communication system ID for identifying the communication system to be used for communication.

The transmission in Step S21 is carried out by the device 20 according to a corresponding operation carried out by the operator of the device 20. It is preferable that the communication system ID to be included in the "device registration request" is previously shown to the operator in a certain way at the time of the conclusion of the management contract or so. Alternatively, it is also possible that before the "device registration request" is transmitted, the device 20 accesses the management apparatus 10 to acquire information of available communication systems from which the operator can select one to be used for communication with the management apparatus 10.

Thus, the management apparatus 10 receives the "device registration request". After that, the management apparatus 10 determines whether it is possible to permit registration of the device 20 concerning the "device registration request" by comparing the received information with the contents of the management contract previously registered in the management apparatus 10 or so. When determining that it is possible to permit registration of the device 20 concerning the "device registration request", the management apparatus 10 registers the information included in the "device registration request" in the device information table (S22). The information registered in Step S22 includes the "device ID" and the "communication system ID" whereas the initial value is registered in the item "communication data amount" in the device information table. By this registration, the management apparatus 10 starts regarding the device 20 concerning the "device registration request" as a management target.

FIG. 6 illustrates an example of the device information table where, in Step S22, the device 20 having the device ID "003" is newly registered. Note that it is assumed that the device having the device ID "001" is registered after Step S12 before Step S21.

The management apparatus 10 updates the items "number of devices" and "permissible communication amount" in the communication system table in response to the registration of the new device 20 (S23). That is, concerning the communication system used by the newly registered device 20, the number of devices is incremented by 1, and along therewith, the permissible communication amount is increased for this device 29. FIG. 6 illustrates an example of the device information table where in Step S23, data is updated concerning the communication system having the communication system ID "A".

After the completion of the registration and updating process described above, the management apparatus 10 transmits a response to the "device registration request" to the device 20 (S24). By this response, the device 20 knows that the device 20 itself is registered as a management target of the management apparatus 10 and starts an operation of transmitting a regular notification and/or the like to be managed by the management apparatus 10.

Figure 7:
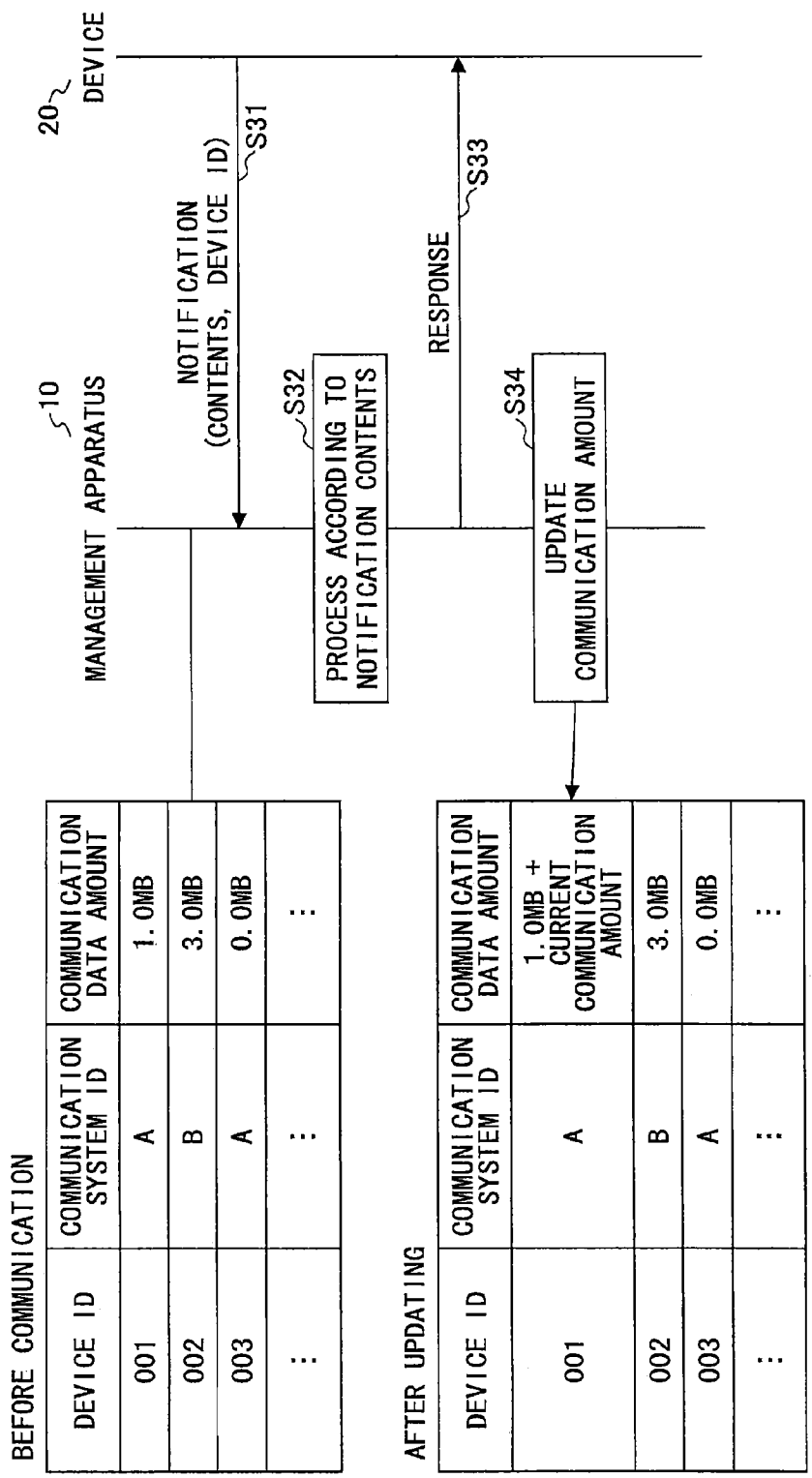
FIG. 7 illustrates one example of operations when a notification is transmitted from the device to the management apparatus.

FIG. 7 illustrates one example of operations when a notification is transmitted from the same device 20 to the management apparatus 10.

The device 20 regularly transmits a notification of its own operational state and/or operation history and/or transmits a notification of a failure when the failure occurs to the management apparatus 10 for being managed by the management apparatus 10 (S31). This notification includes not only the contents to be thus reported but also the device ID of the device 20 itself. Further, this notification is transmitted using the communication system for which the registration was requested in Step S21 of FIG. 6. Also this communication system is used for communication carried out thereafter.

When the management apparatus 10 receives the notification of Step S31, the management apparatus 10 carries out a process according to the contents of the received notification (S32) and returns a response to the notification (S33). This process includes, for example, recoding the operational state and/or the like, arranging acquisition of the situation according to a failure, if any, or the like.

Thereafter, the management apparatus 10 adds the communication data amount of the currently received notification and transmitted response to the device information table for the device 20 that is the transmission source (S34). By such a process, the management apparatus 10 manages, for each device (management target), the communication data amounts between the management apparatus 10 and the device 20. FIG. 6 shows examples of the states of the device management table before receiving the notification in Step S31 and after updating in Step S34.

Figure 8:
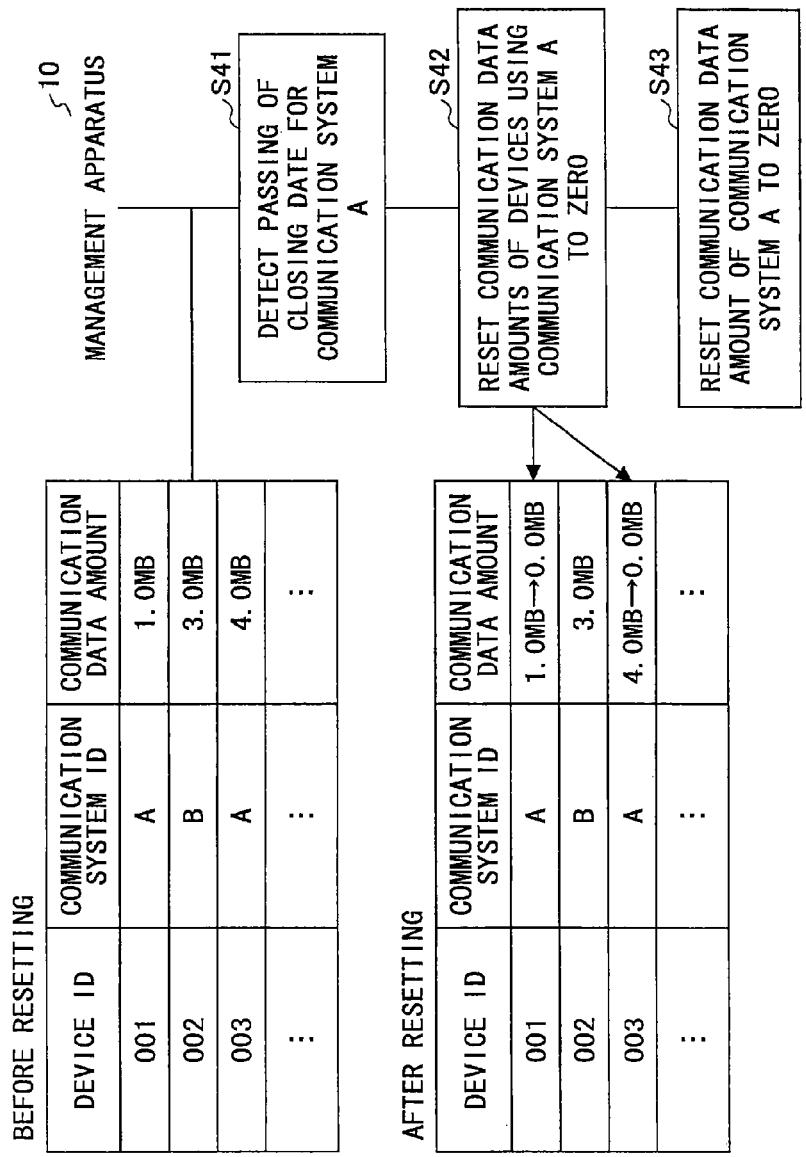
FIG. 8 illustrates one example of operations of the management apparatus when a closing date of a communication system "A" has passed.

FIG. 8 illustrates one example of operations of the management apparatus 10 when the closing date of the communication system "A" has passed.

When the management apparatus 10 detects, using a calendar and a clock not shown, that the closing date has passed for the communication system "A" (in this example, the closing date "25th" (see FIG. 4) in the current month has passed) (S41), the management apparatus 10 searches the device information table and resets the communication data amount to zero for the devices using the communication system "A" (S42). Also, the management apparatus 10 resets, in the communication system table, the communication data amount of the communication system "A" into zero (S43). FIG. 8 illustrates examples of the device information table before and after resetting in Step S42.

This process is carried out before the next totaling period starts for the purpose of being able to measure the communication data amounts for the next totaling period. Also for each of all the communication systems registered in the communication system table other than the communication system "A", the management apparatus 10 carries out the same process when detecting that the closing date has passed for the communication system.

Figure 9:
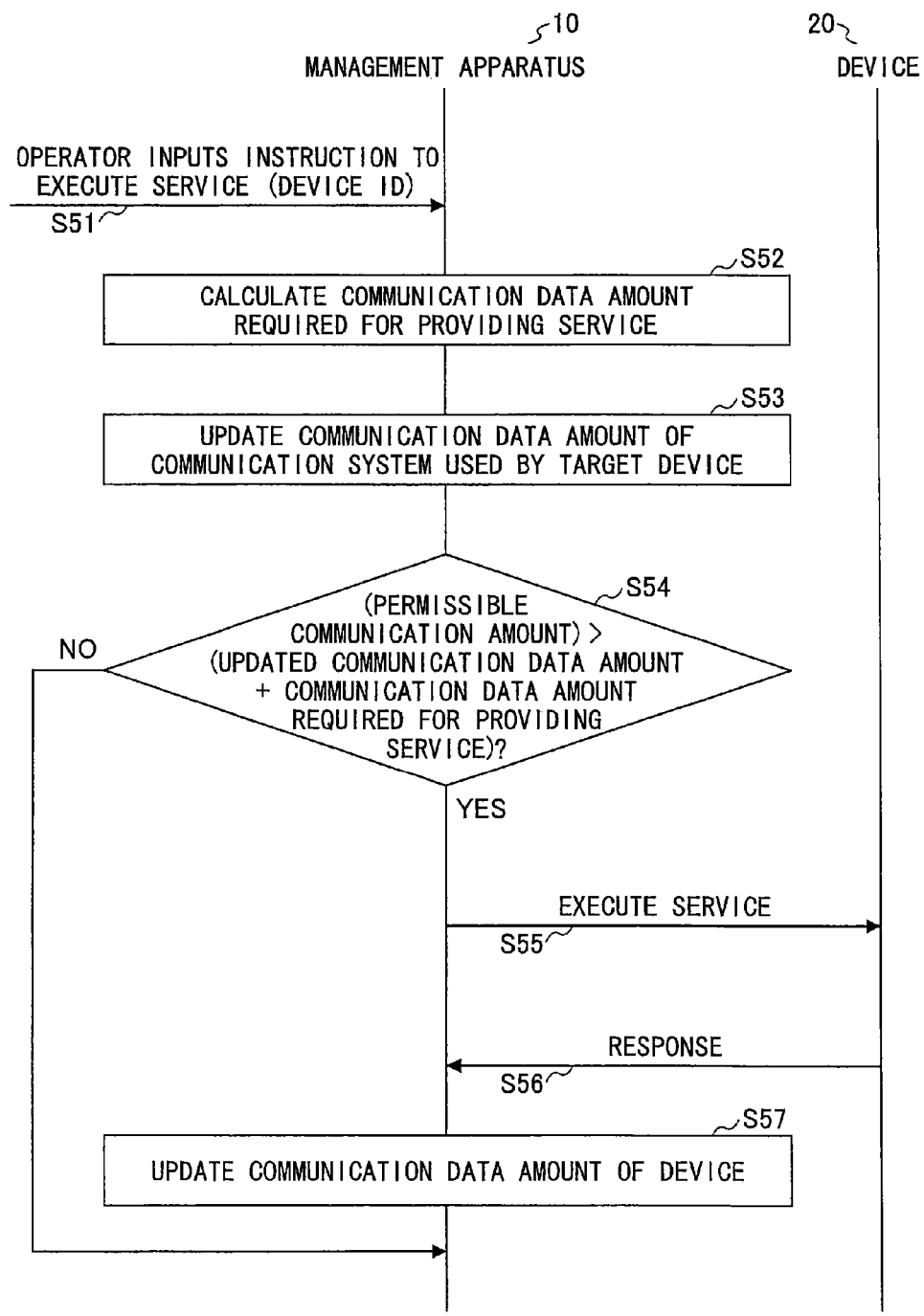
FIG. 9 illustrates one example of operations of the management apparatus when the operator of the management apparatus inputs an instruction for executing a service to a device.

FIG. 9 illustrates one example of operations of the management apparatus 10 when the operator of the management apparatus 10 inputs an instruction for executing a service to a device 20.

The operator of the management apparatus 10 can designate the device ID of any device 20 of a management target and a type of a service to be provided and inputs an instruction to the management apparatus 10 to provide a service to the device 20. Here, it is assumed that the instruction that the operator thus inputs is an instruction to provide a service to be provided by the service providing part 106.

In response to receiving the instruction (S51), the management apparatus 10 calculates the communication data amount required for providing the service concerning the instruction (S52). This calculation can be carried out based on the size of data estimated to be transmitted and received when providing the service.

Next, the management apparatus 10 updates the communication data amount (sum) in the communication system table concerning the communication system used by the device 20 thus designated as a service providing target in Step S51 (S53). That is, the management apparatus 10 acquires the communication data amounts concerning the respective devices 20 using the communication system used by the device 20 thus designated as the service providing target in Step S51 from the device management table, totals them and registers the total in the communication system table. This totaling process is not needed at the present time if the management apparatus 10 carries out such a totaling process each time when carrying out communication with any device 20. However, if the management apparatus 10 does not carry out such a totaling process in such a real-time manner for reducing the process load, the above-mentioned totaling process needs to be carried out before the subsequent Step S54.

Next, the management apparatus 10 determines whether to be able to provide the service (S54) based on the data amount for providing the service calculated in Step S52, the communication data amount of the communication system used by the target device 20 calculated (by totaling) in Step S53 and the permissible communication amount of the same communication system. In Step S54, the CPU 11 acts as a determination part.

The determination criterion used in Step S54 is such that it is determined to be able to provide the service when the permissible communication amount is greater than the sum of the communication data amount of this communication system and the communication data amount required to provide the service and otherwise it is determined to not be able to provide the service. This is because, when the permissible communication amount is greater, it is expected that even when providing the service at this time, the communication data amount of each communication system does not exceed its permissible communication amount.

However, in order to avoid adversely affecting the regular operations from now within the current totaling period, another criterion such as to provide a certain margin can also be considered.

It is also possible to consider estimating the communication data amount of this communication system to be acquired at the time of the subsequent closing date of this communication system based on the communication data amount and the closing date registered in the communication system table concerning this communication used by the target device 20 and use the thus estimated communication data amount instead of the current data amount in the determination of Step S54. This estimation can be carried out assuming that the communication at the current pace will also continue from now through the calculation "(the current communication data amount)/(the elapsed days in the current totaling period)×(the total days of the current totaling period)" or any other appropriate method.

By using such an estimated amount, it is possible to determine to be able to provide a service only when it can be estimated that, even if providing the service now, this does not adversely affect the regular operations from now within the current totaling period.

When thus determining to be able to provide the service (YES in S54), the management apparatus 10 executes the service to the device 20 according to the instruction received in Step S51 (S55). Then, the management apparatus 10 receives a response thereto from the device 20 (S56). Thereafter, the management apparatus 10 updates (adds to) the communication data of this device 20 according to the data amount actually transmitted and received between the management apparatus 10 and this device 20 when currently providing the service (S57).

By these operations, the management apparatus 10 can determine whether to be able to provide a service while considering the permissible communication amount of each communication system. Therefore, as long as the permissible communication amount of each communication system is not exceeded, it is possible to provide a service even accompanied by such data transmission/reception as to exceed the permissible communication amount per device. Therefore, even the usable communication amount is limited, it is possible to provide a service requiring communication to a device (management target) efficiently.

Figure 10:
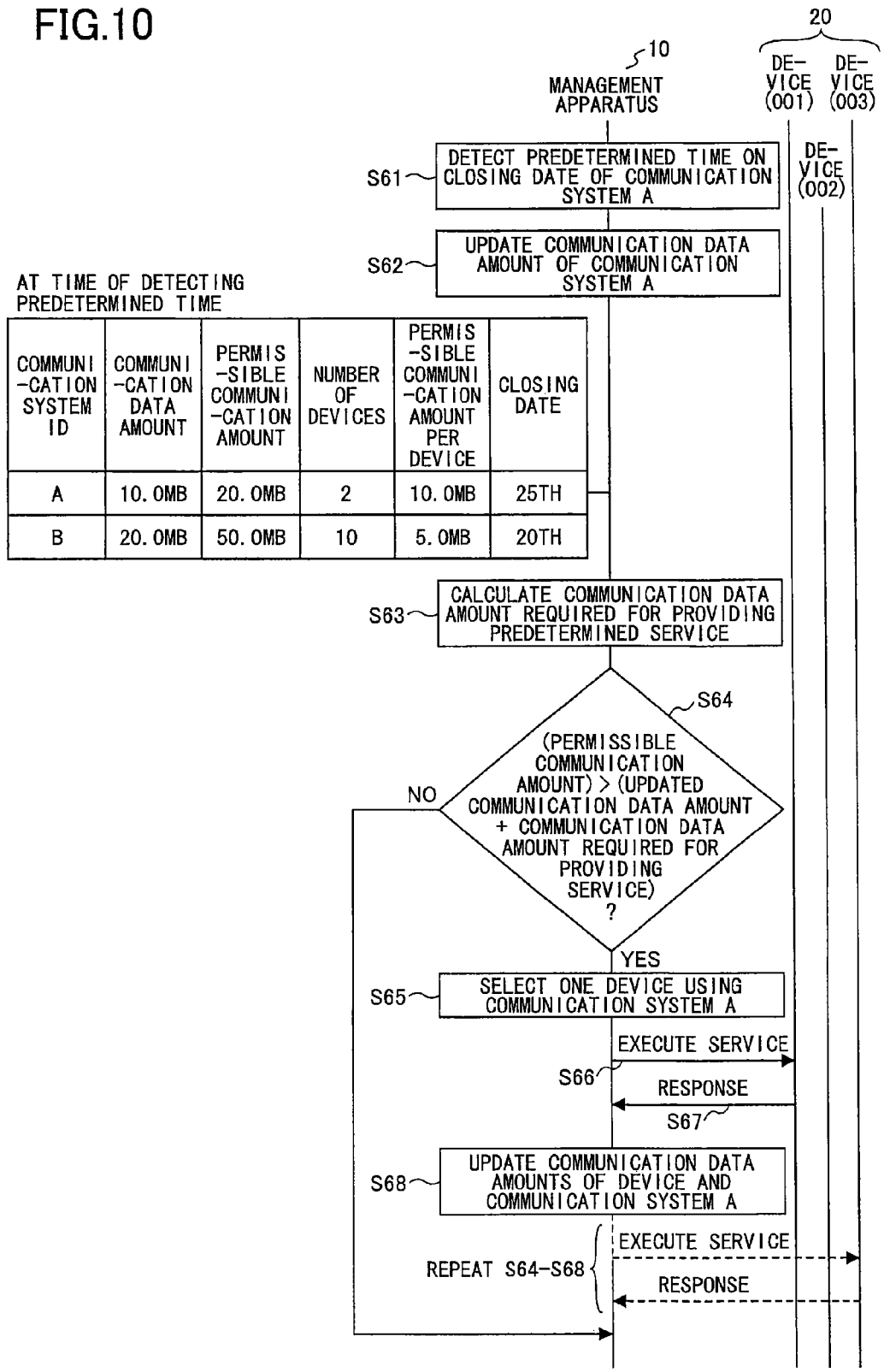
FIG. 10 illustrates one example of operations of the management apparatus on the closing date of the communication system "A"

FIG. 10 illustrates one example of operations of the management apparatus 10 on the closing date of the communication system "A". The operations of FIG. 10 are such that when, concerning the closing date of each communication system, the communication data amount of the communication system has a margin on its closing date, the management apparatus 10 provides a service to a device 20 within the range of the margin.

In the operations of FIG. 10, when the management apparatus 10 detects that a predetermined time on the closing has come for the communication system "A" (S61), the management apparatus 10 updates the communication data amount (sum) in the communication system table concerning the communication system "A" as in Step S53 of FIG. 9 (S62). Note that the "predetermined time" is determined appropriately as a time from when communication with any device 20 is not very likely to be carried out and a time for providing a service remains. FIG. 10 illustrates an example of the communication system table after updating in Step S62.

Thereafter, concerning a service which is previously determined to be provided on the closing date, the management apparatus 10 calculates the communication data amount required for providing the service to a device 20 (S63). This calculation can be carried out in the same manner as Step S52 of FIG. 9. However, if it is expected that the communication data amount considerably varies depending on which device 20 is the target device, it is preferably that device selection in Step S65 is executed prior to Step S63.

Next, the management apparatus 10 determines whether to be able to provide the service in the same manner as Step S54 of FIG. 9 (S64). Noted that the data used here is the data amount required for providing the service calculated in Step S63, the data communication amount of the communication system whose closing date has come which is calculated (by totaling) in Step S62 and the permissible communication amount of the same communication system. The management apparatus 10 determines to be able to provide the service when the communication data amount of the communication system has such a margin as to be able to provide the service while comparing it with the permissible communication amount. However, it is not necessary to consider the margin or the estimated amount described above in the description of FIG. 9. Also in Step S64, the CPU 11 functions as the determination part.

In this case, the management apparatus 10 selects one from among the devices 20 which use the communication system "A" (S65), executes the above-mentioned service previously determined to the selected device 20 (S66) and receives a response thereto (S67). Thereafter, according to the data amount actually transmitted and received between the management apparatus 10 and the device 20 when currently providing the service, the management apparatus 10 updates (adds it to) the communication data amount of this device 20 in the device management table, and also, re-calculates the communication data amount of the thus used communication system "A" (S68).

Thereafter, the management apparatus 10 repeats Steps S64-S68 (also S63, if necessary) until no device 20 to which the service is to be provided remains or it is determined not to be able to provide the service in Step S64. Then, if either condition is satisfied, the process of FIG. 10 is finished.

Note that, in Step S65, basically a device 20 to which the service has not been executed is selected. However, if the service is a service such that providing it to the same device a plurality of times makes sense, it is also possible to provide the service to the same device a plurality of times.

By the above-mentioned operations, the management apparatus 10 can provide a service accompanied by communication using the permissible communication amount left unused until the closing date particularly without considering saving the communication amount and/or an additional cost. Therefore, it is possible to provide a service requiring communication to a device(s) (management target (s)) efficiently even when there is a limitation of a communication amount.

Also for each of all the communication systems registered in the communication system table other than the communication system "A", the management apparatus 10 carries out the same process when detecting that a predetermined time on the closing date thereof has come.

Figure 11:
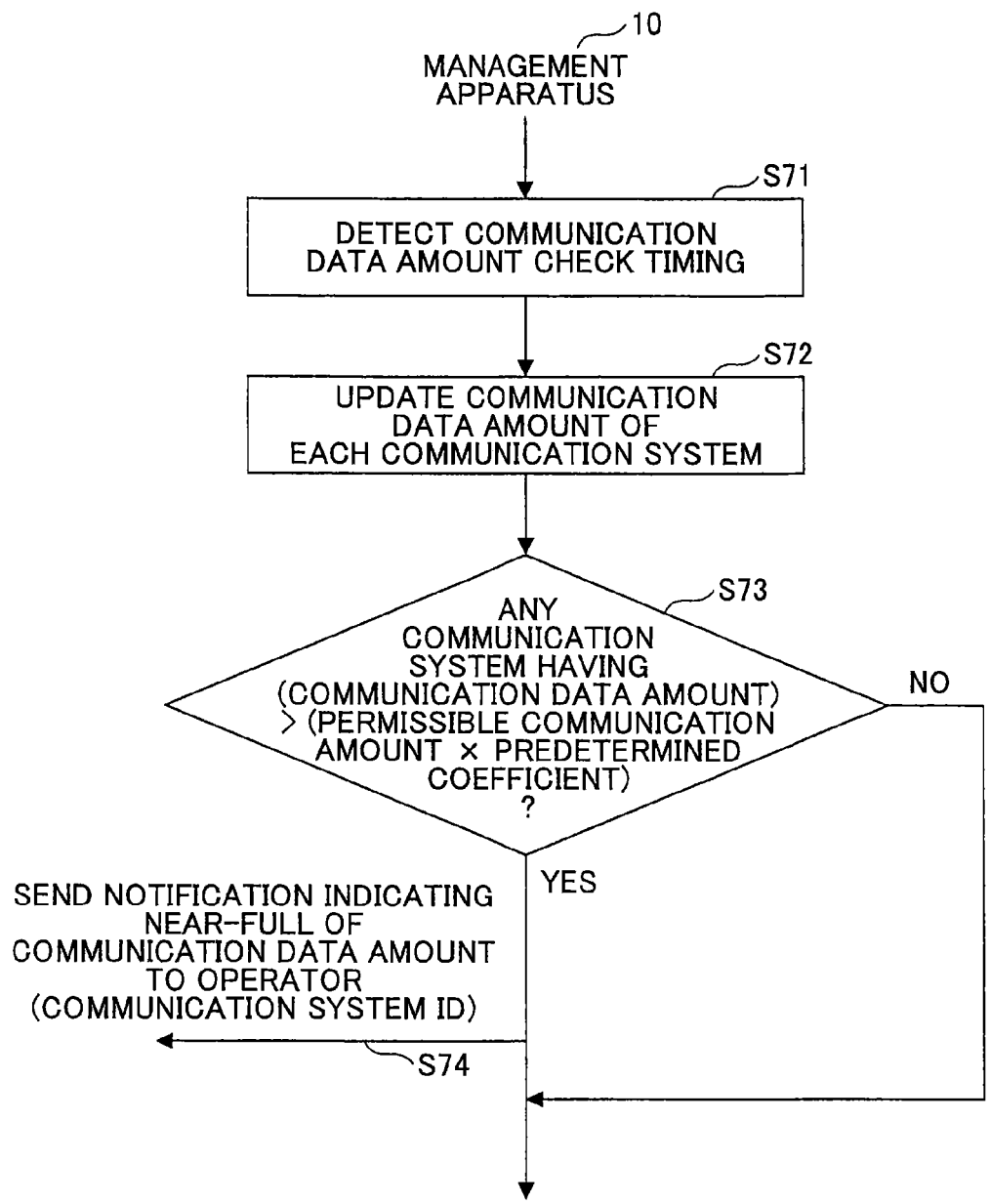
FIG. 11 illustrates one example of operations of the management apparatus when totaling communication data amounts.

FIG. 11 illustrates one example of operations of the management apparatus 10 when totaling the communication data amounts.

When the management apparatus 10 detects that a predetermined communication data amount check timing has come, such as at every predetermined cycle or so (S71), the management apparatus 10 updates the communication data amount of each communication system in the communication system table (S72). That is, for each communication system, the management apparatus 10 acquires and totals the communication data amounts of the respective devices 20 which use the communication system from the device management table, and registers the thus acquired total in the communication system table. Note that it is also possible to provide a plurality of times of communication data amount check timing within each cycle.

Thereafter, the management apparatus 10 determines whether there is(are) any communication system(s) for (each of) which the thus acquired communication data amount (total) exceeds a value acquired from multiplying the permissible communication amount by a predetermined coefficient, in other words, the communication data amount has reached a predetermined percentage of the permissible communication amount (S73). The "predetermined percentage" is a value that means that the communication data amount will likely to exceed the permissible communication amount soon. The specific numerical value is previously set in the management apparatus 10 by the administrator of the management apparatus 10.

Then, in Step S73, if there is(are) a corresponding communication system(s), the management apparatus 10 sends a notification to the operator which is a predetermined notification target indicating this matter and the communication system ID(s) of the corresponding communication system(s) (S74). The specific method of sending the notification can be any method such as displaying the corresponding information on the display device, providing a sound, transmitting an electronic mail, or so. In Step S74, the CPU 11 functions as a notification part.

By the above-mentioned operations, the operator of the management apparatus 10 can receive a corresponding warning before the communication data amount actually exceeds the permissible communication amount and, based thereon, can adjust the contents and/or frequency of service providing instructions.

Further, by calculating the communication data amount of each communication system (by totaling) at a predetermined communication data amount check timing, it is possible to reduce the process load required for the totaling process.

Figure 12:
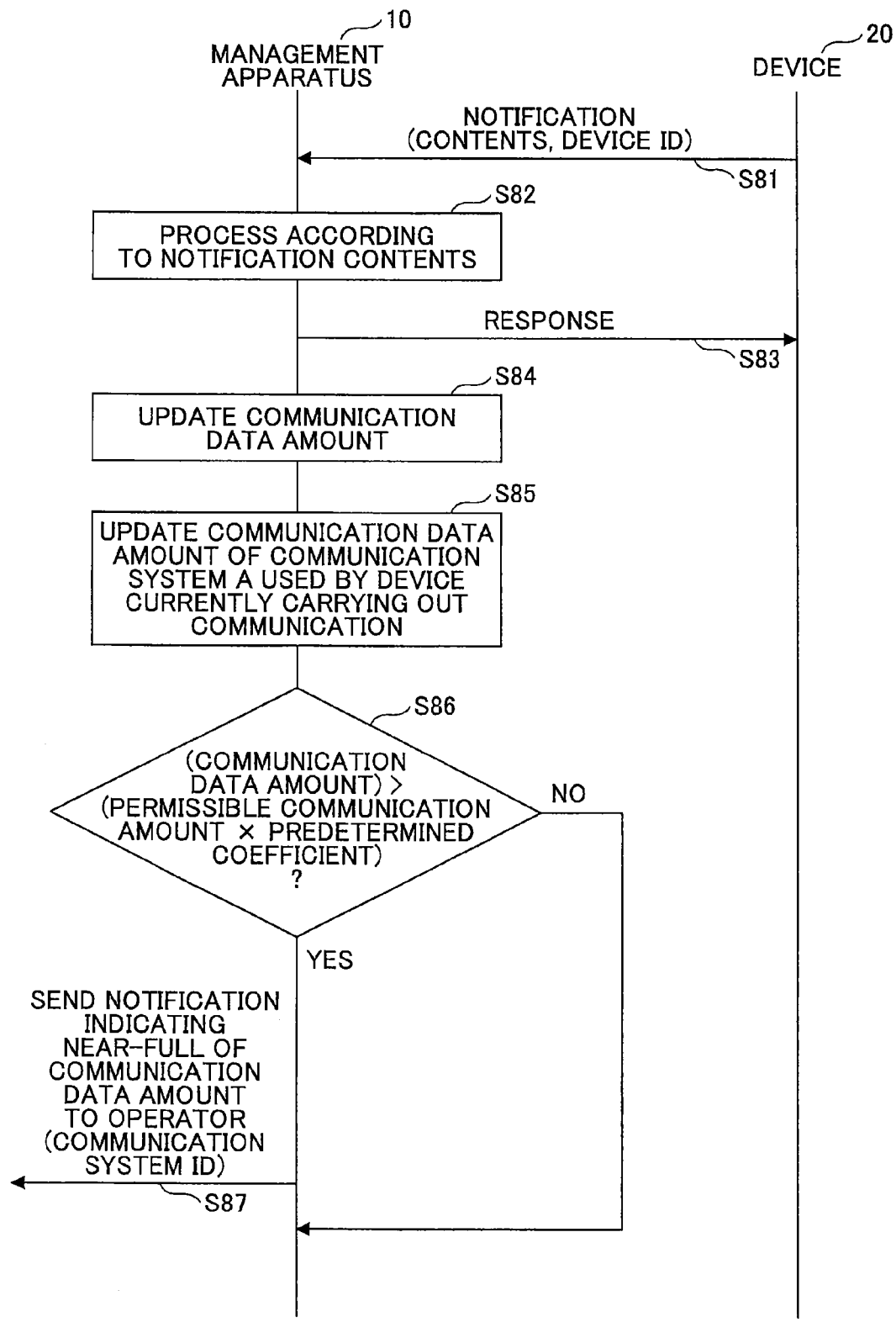
FIG. 12 illustrates one example of operations of the management apparatus when having received a notification from a device in another example than FIG. 7.

FIG. 12 illustrates one example of operations of the management apparatus 10 when having received a notification from a device 20 in another example than FIG. 7.

In FIG. 12, Steps S81-S84 are the same as Steps S31-S34 of FIG. 7. That is, the management apparatus 10 carries out operations concerning a notification received from a device 20, returns a response to the device 20 and adds the data amount transmitted and received at this time to the communication data amount concerning the device 20.

Thereafter, the management apparatus 10 updates the value of the communication data amount of the communication system used by the device 20 with which the management apparatus 10 has currently carried out the communication in the communication system table (S85). That is, for this communication system, the management apparatus 10 acquires and totals the communication data amounts of the respective devices 20 which use the communication system from the device management table, and registers the thus acquired total in the communication system table.

Next, in the same manner as Step S73 of FIG. 11, the management apparatus 10 determines for this communication system, whether the communication data amount exceeds a value acquired from multiplying the permissible communication amount with a predetermined coefficient (S86). When the communication data amount exceeds the value acquired from multiplying the permissible communication amount with the predetermined coefficient, the management apparatus 10 sends a notification to the operator indicating this matter and the communication system ID of this communication system (S87).

Also by these operations, the operator of the management apparatus 10 can receive a corresponding warning before the communication data amount actually exceeds the permissible communication amount, and, based thereon, can adjust the contents and/or frequency of service providing instructions.

Further, by thus carrying out the operations when receiving the notification as illustrated in FIG. 12 and thus calculating the communication data amount (by totaling) for each communication system in response to receiving a notification from a device 20, it is possible to know the communication data amount of each communication system in a real-time manner and it is possible to rapidly send a near-full notification.

In the present invention, the specific configuration of each part, the specific procedure of each process, the specific configuration and format of data to be dealt with, the determination criterion, and so forth, are not limited to those described above for the embodiment.

Figure 13:
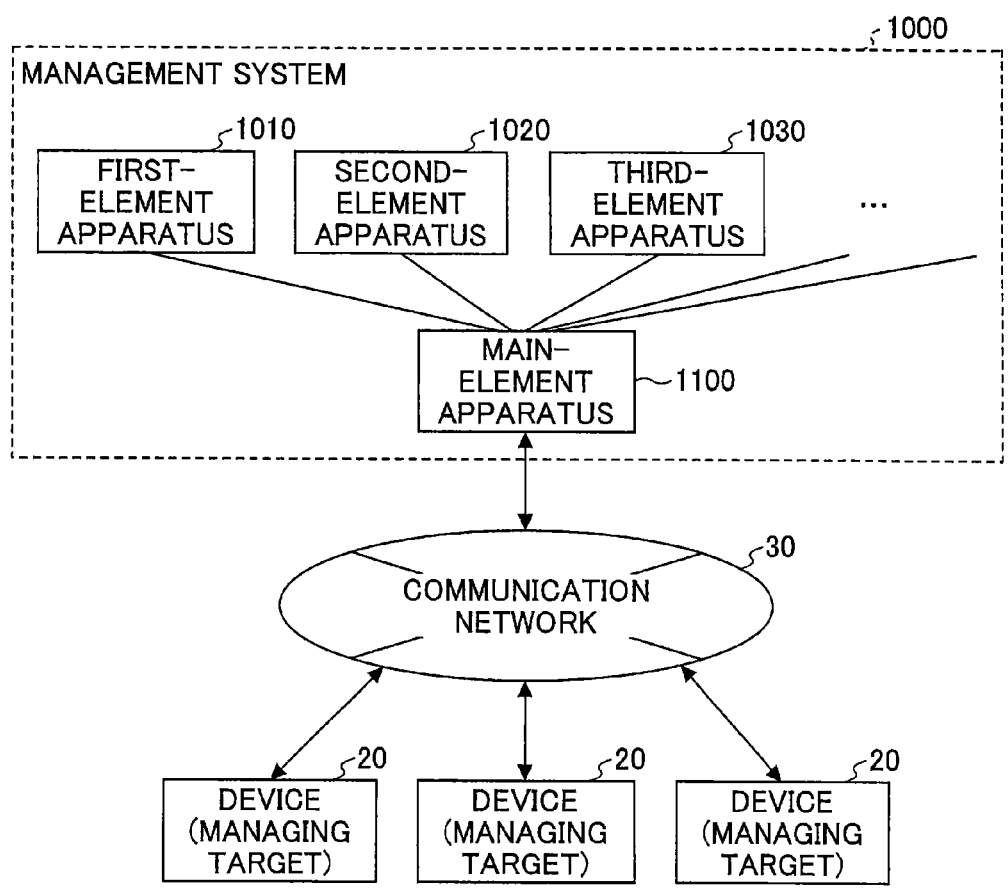
FIG. 13 illustrates a relationship between a management system according to a variant of the embodiment of the present invention and devices managed by the management system.

For example, the functions of the management apparatus 10 can be carried out not only by a single apparatus but also by a plurality of apparatuses in a distributed manner. In the latter case, as illustrated in FIG. 13, the plurality of apparatuses (for example, a first-element apparatus 1010, a second-element apparatus 1020, a third-element apparatus 1030, . . . and a main-element apparatus 1100) can cooperatively act as a management system 1000 having the same functions as the above-mentioned management apparatus 10 while cooperating with each other.

Further, the present invention can be applied also to a case where the management apparatus 10 and the devices 20 as management targets carry out communication with each other via an intermediating apparatus(s) relaying communication therebetween. In this case, in the communication path(s) between the management apparatus 10 and the devices 20, the communication data amounts transmitted/received through parts of the communication path(s) for which the usable communication data amount(s) is(are) limited by a contract(s) can be managed in the same way as the above-described embodiment and can be used for determining whether to be able to provide services.

Further, the devices 20 as management targets are not limited to image forming apparatuses or projection apparatuses. It is also possible to apply the present invention in a case where the management targets are communication apparatuses acquired from including communication functions in various electronic apparatuses such as network household electrical appliances, automatic dispensers, medical devices, power-supply apparatuses, air-conditioning apparatuses, metering systems measuring gas, water, electricity or so, automobiles, airplanes, general-purpose computers and so forth.

Further, the above-described embodiment and variant thereof can be freely combined unless they contradict each other.

Thus, the management apparatus and the management system have been described by the embodiment and variant thereof. However, the present invention is not limited to the specifically disclosed embodiment and variant, and variations and modifications may be made without departing from the scope of the present invention.

The present application is based on and claims the benefit of priority of Japanese Priority Application No. 2013-170214 filed Aug. 20, 2013, the entire contents of which are hereby incorporated herein by reference.

What is claimed is:

1. A management apparatus managing a plurality of devices, the management apparatus comprising:
processing circuitry configured to
manage, for each one of the devices, one of a plurality of communication systems for carrying out communication between the management apparatus and the one of the devices and a communication data amount between the management apparatus and the one of the devices;
set a permissible communication amount for each one of the communication systems;
manage a closing date for each one of the communication systems;
estimate, based on the closing date of one of the communication systems and a first total of the communication data amounts of respective ones of the devices each using the one of the communication systems, a second total of the communication data amounts of the respective ones of the devices each using the one of the communication systems until the closing date of the one of communication systems; and
determine whether to be able to provide the service to the one of the devices based on the communication data amount required for providing the service to the one of the devices, the permissible communication amount of one of the communication systems used by the one of the devices and the second total of the communication data amounts of the respective ones of the devices each using the one of the communication systems.

2. The management apparatus as claimed in claim 1, wherein
the processing circuitry is configured to provide, when a total of the communication data amounts of respective ones of the devices each using the one of the communication systems has not reached the permissible communication amount of the one of the communication systems at the closing date of any one of the communication systems, a predetermined service accompanied by communication to any one of the devices using the one of the communication systems.

3. The management apparatus as claimed in claim 1, wherein
the processing circuitry is configured to update, in response to receiving a notification from one of the devices using one of the communication systems, a total of the used communication data amounts of respective ones of the devices each using the one of the communication systems.

4. The management apparatus as claimed in claim 1, wherein
the processing circuitry is configured to update, at a predetermined cycle for each one of the communication systems, a total of the communication data amounts of respective ones of the devices each using the one of the communication systems.

5. The management apparatus as claimed in claim 1, wherein
the processing circuitry is configured to send, when detecting for any one of the communication systems that a total of the communication data amounts of respective ones of the devices each using the one of the communication systems exceeds a predetermined percentage of its permissible communication amount, a notification indicating that a total of the communication data amounts of respective ones of the devices each using the one of the communication systems exceeds the predetermined percentage of its permissible communication amount to a predetermined notification destination.

6. A management system, comprising:
a plurality of devices; and
a management apparatus including processing circuitry configured to
manage, for each one of the devices, one of a plurality of communication systems for carrying out communication between the management apparatus and the one of the devices and a communication data amount between the management apparatus and the one of the devices;
set a permissible communication amount for each one of the communication systems;
manage a closing date for each one of the communication systems;
estimate, based on the closing date of one of the communication systems and a first total of the communication data amounts of respective ones of the devices each using the one of the communication systems, a second total of the communication data amounts of the respective ones of the devices each using the one of the communication systems until the closing date of the one of communication systems; and
determine whether to be able to provide the service to the one of the devices based on the communication data amount required for providing the service to the one of the devices, the permissible communication amount of one of the communication systems used by the one of the devices and the second total of the used communication data amounts of the respective ones of the devices each using the one of the communication systems.

\* \* \* \* \*